United States Patent [19]

Patil et al.

[11] 4,414,033

[45] Nov. 8, 1983

[54] PROCESS FOR PREPARING FERRIFERROCYANIDE PIGMENTS

[75] Inventors: Arvind S. Patil, Wyoming; John H. Bantjes; John T. Ouderkirk, both of Holland, all of Mich.

[73] Assignee: BASF Wyandotte Corporation, Wyandotte, Mich.

[21] Appl. No.: 318,752

[22] Filed: Nov. 6, 1981

[51] Int. Cl.$^3$ .......................... C08K 3/00; C09D 11/00; C09C 1/26

[52] U.S. Cl. ...................................... 423/367; 106/20; 106/304

[58] Field of Search ................... 423/367; 106/19, 304

[56] References Cited

U.S. PATENT DOCUMENTS

| | | | |
|---|---|---|---|
| 2,005,698 | 6/1935 | Grove | 106/304 |
| 2,592,169 | 4/1952 | Morrison et al. | 106/304 |
| 2,656,282 | 10/1953 | Clarke | 106/304 |
| 3,985,571 | 10/1978 | Reinhardt et al. | 423/367 |

*Primary Examiner*—Theodore Morris

*Attorney, Agent, or Firm*—Joseph D. Michaels

[57] ABSTRACT

The subject invention relates to a process for preparing ferriferrocyanide pigments. The process comprises
(1) forming a reaction mixture containing a ferrous salt and an alkali metal ferrocyanide;
(2) adding an alkaline compound to said reaction mixture in an amount sufficient to raise the pH to at least 9;
(3) oxidizing the basic solution by aeration;
(4) heating the solution to a temperature of from 10° C. to 90° C. and
(5) recovering the pigment.

The advantage of the process is that no significant amount of Berlin White intermediate is formed. Consequently, it is unnecessary to use sulfuric acid to dissolve the Berlin White before oxidation. Moreover, oxidation is achieved by aeration. This is cost effective and reduces the stress to the environment. The resulting pigments are useful in coloring printing ink and carbon paper.

7 Claims, No Drawings

PROCESS FOR PREPARING FERRIFERROCYANIDE PIGMENTS

BACKGROUND OF THE INVENTION

1. Field of the Invention

This invention relates to the preparation of inorganic pigments. More specifically, it relates to the preparation of ferriferrocyanide pigments, also known as iron blue pigments.

2. Description of the Prior Art

Ferriferrocyanide pigments are well known in the art. The term "ferriferrocyanide pigments" covers a variety of pigments with various chemical formulae. The chemical formula of the pigment will depend upon what the starting materials are and the specific reaction conditions. For a discussion of the various ferriferrocyanide pigments, see Temple C. Patton, *Pigment Handbook*, pages 401–407 (John Wiley & Sons, New York, 1973). This reference and the patent literature disclose that ferriferrocyanide pigments are prepared by the reaction of a solution of sodium ferrocyanide and ferrous sulfate in the presence of ammonium sulfate which forms the so-called Berlin White, $Fe(NH_4)_2Fe(CN)_6$. The Berlin White is digested in sulfuric acid and then oxidized with sodium bichromate or chlorate to give the ferriferrocyanide pigment. The pigment is washed, pressed, dried, and ground into a finished product. Several patents are quite specific in requiring that the reaction of the sodium ferriferrocyanide and ferrous sulfate be carried out in the presence of ammonium sulfate and do not suggest any substitutes for the ammonium sulfate. See for example U.S. Pat. Nos. 2,275,929, 2,592,169, and 3,021,191 all of which require that ammonium sulfate be used in the preparation of the ferriferrocyanide pigment described therein.

The use of ammonium sulfate creates problems with respect to processing. The process is expensive because the Berlin White intermediate which is formed must be dissolved in sulfuric acid and it is necessary to dispose of the sulfates formed. Therefore, it would be advantageous if a process could be developed which eliminated the formation of the Berlin White and the need to dissolve it in sulfuric acid.

U.S. Pat. No. 2,622,037 describes a process for preparing ferriferrocyanide pigments without the formation of Berlin White. The process comprises mixing an aqueous solution of a divalent iron salt with a water solution of a water soluble salt of hydroferrocyanic acid to form a mixture, and treating the resulting mixture with nitrous acid to form an insoluble ferriferrocyanide compound. This process is quite different from the process which will be described herein. It does not utilize an alkaline compound and it requires the use of nitrous acid.

SUMMARY OF THE INVENTION

The subject invention relates to a process for preparing ferriferrocyanide pigments. The process comprises (1) forming a reaction mixture containing essentially equimolar amounts of a ferrous salt and an alkali metal ferrocyanide in an aqueous solution;

(2) adding an alkaline compound to said reaction mixture in an amount sufficient to raise the pH to at least 9;

(3) oxidizing the basic solution by aeration;

(4) heating the solution to a temperature of from 10° C. to 90° C.; and (5) recovering the pigment.

The advantage of the process is that no significant amount of Berlin White intermediate is formed and air is used to oxidize the ferrous ion to ferric ion. Consequently, it is unnecessary to use sulfuric acid to dissolve the Berlin White before oxidation. This is cost effective and reduces the stress to the environment. The resulting pigments are useful in coloring printing ink and carbon paper.

DESCRIPTION OF THE PREFERRED EMBODIMENT

The first step of the process involves forming a reaction mixture containing a ferrous salt and an alkali metal ferrocyanide. Generally, ferrous sulfate is preferred as the ferrous salt because of its availability. Hydrated forms of ferrous salts may also be used. Generally, potassium or sodium ferrocyanide are preferred as the alkali metal ferrocyanide because of their availability. The mole ration of ferrous salt to alkali metal ferrocyanide ranges from 1:0.9 to 1:1.5, preferably 1:1.

Since the ferrous salt and alkali metal ferrocyanide compound are solids at room temperature, it is necessary to dissolve them in a solvent. Preferably they are dissolved in water. Although the amount of water used to dilute the mixture is not critical, preferably the concentration of solids to liquid ranges from 100 grams per liter to 300 grams per liter. A preferred method of forming the reaction mixture is by dissolving the ferrous salt in water and then adding the ferrocyanide compound. It is also preferred to use ice along with the water to maintain a low temperature such as 10° C. It is also preferred to use a small amount of sulfuric acid to dissolve the ferrous salt. If sulfuric acid is used to assist in the dissolving of the ferrous salt, the mole ratio of ferrous salt to sulfuric acid ranges from 1:1 to 1:0.15.

After the mixture of ferrous salt and alkali metal ferrocyanide is formed, the alkaline compound is added to the reaction mixture in an amount such that the pH is raised to at least 9. An alkaline compound is any compound which acts as a Lewis base. Preferably used as the alkaline compound are ammonium hydroxide, ammonia, or an alkaline metal hydroxide. Most preferably used, however, is ammonium hydroxide. The basic solution is then oxidized by aeration in order to convert the ferrous ion to the ferric state. One can determine whether the reaction is complete by the development of color. Generally, it is preferred to aerate the mixture at increased pressure such as from 10 to 50 pounds per square inch.

After completing the oxidation of the solution, the solution is heated at increased temperatures of from 10° C. to 90° C. Generally it is sufficient to heat the solution for about 30 to 60 minutes.

After the heating has been completed, the solution is filtered while it is still warm. It is then washed and dried at approximately 75° C.

The following examples will further illustrate in more detail the practice of this invention. The parts listed are by weight unless otherwise designated, and the temperatures are in degrees Centigrade unless otherwise designated. The examples which follow are intended to illustrate the practice of the subject invention, but are in no way intended to limit its application.

EXAMPLE 1

In a 4 liter beaker equipped with an agitator and resting on a hot plate, 81 grams of ferrous sulfate heptahydrate were added. This was diluted with 3 liters of ice and water to lower the starting reaction temperature to 10° C. The solution was stirred until dissolved and to it was added 145 grams of sodium ferrocyanide [(Na$_4$FeCCN)$_6$.10 H$_2$O] dissolved in about 200 ml water. Ammonium hydroxide was then added under agitation to raise the pH to 9. The solution was then aerated from a 50 psi air line with an appropriate flow meter to control the airflow. The aeration continued for 30 minutes during which the pigment progressively became darker blue. The reaction mixture was then heated to 90° C. on the hot plate, after which all equipment was turned off and the pigment was filtered from the hot slurry. It was then washed and dried at 75° C. to recover the ferriferrocyanide pigment. The pigment was dark blue color and had good tinctorial strength.

EXAMPLE 2

In a 4 liter beaker equipped with an agitator and resting on a hot plate, 81 grams of ferrous sulfate hydrate and 4 grams of sulfuric acid (96%) were added. This was diluted with 3 liters of ice and water to lower the temperature to 10° C. The solution was stirred until dissolved and then 123 grams of potassium ferrocyanide were added and stirred until dissolved. Ammonium hydroxide was then added to the solution to raise the pH to 9.0. The solution was then aerated for 30 minutes at 50 pounds per square inch. After the aeration was completed, the solution was heated to 90° C. The equipment was then turned off and the hot solution was filtered. It was then washed and dried at 75° C. to recover the ferriferrocyanide pigment. The pigment was blue and had good tinctorial strength.

EXAMPLE 3

Example 1 was duplicated except that no ice was added to the original solution and the reaction was carried out at 25° C. (room temperature). The pigment produced had similar quality to that of Example 1.

EXAMPLE 4

Example 1 was duplicated except that 218 grams of sodium ferrocyanide was used to react with 81 grams of ferrous sulfate. The pigment produced had satisfactory tinctorial properties.

EXAMPLE 5

Example 1 was duplicated except that sodium hydroxide was used to adjust the pH to 9. The pigment had comparable properties to the pigment of Example 1.

EXAMPLE 6

Example 5 was duplicated except that potassium hydroxide was used to adjust the pH to 9. The pigment had a dark blue color and satisfactory tinctorial strength.

The embodiment of this invention in which an exclusive privilege or property is claimed are defined as follows:

1. A process for preparing a ferriferrocyanide pigment in the absence of ammonium sulfate comprising
   (a) forming a reaction mixture containing a ferrous salt and an alkali metal ferrocyanide in an aqueous solution in a mole ratio of ferrous salt to alkali metal ferrocyanide of from 1:0.9 to 1:1.5;
   (b) adding an alkaline compound to the solution in an amount sufficient to raise the pH to at least 9;
   (c) oxidizing the basic solution by aeration;
   (d) heating the solution to from 10° C. to 90° C.; and
   (e) recovering the pigment.
2. The process of claim 1 wherein sulfuric acid is added to the reaction mixture of (a) to assist in the dissolving of the ferrous salt and alkali metal ferrocyanide.
3. The process of claim 1 wherein the mole ratio of ferrous salt to alkali metal ferrocyanide is essentially 1:1.
4. The process of claim 1 wherein the ferrous salt is ferrous sulfate.
5. The process of claim 4 wherein the alkali metal ferrocyanide is selected from the group consisting of potassium ferrocyanide and sodium ferrocyanide.
6. The process of claim 5 wherein the alkaline compound is selected from the group consisting of ammonium hydroxide, ammonia, potassium hydroxide, and sodium hydroxide.
7. The process of claim 6 wherein the alkaline compound is ammonium hydroxide.

* * * * *